US011158872B2

(12) United States Patent
Hattori

(10) Patent No.: US 11,158,872 B2
(45) Date of Patent: Oct. 26, 2021

(54) FUEL GAS SUPPLY SYSTEM

(71) Applicant: HONDA MOTOR CO., LTD., Tokyo (JP)

(72) Inventor: Makoto Hattori, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 155 days.

(21) Appl. No.: 16/544,961

(22) Filed: Aug. 20, 2019

(65) Prior Publication Data

US 2020/0067113 A1 Feb. 27, 2020

(30) Foreign Application Priority Data

Aug. 23, 2018 (JP) .............................. JP2018-155937

(51) Int. Cl.
*H01M 8/04* (2016.01)
*H01M 8/04089* (2016.01)
*H01M 8/04082* (2016.01)
*H01M 8/0438* (2016.01)
*H01M 8/04746* (2016.01)
*H01M 8/04664* (2016.01)

(52) U.S. Cl.
CPC ... *H01M 8/04104* (2013.01); *H01M 8/04201* (2013.01); *H01M 8/04388* (2013.01); *H01M 8/04671* (2013.01); *H01M 8/04753* (2013.01); *H01M 2250/20* (2013.01)

(58) Field of Classification Search
CPC .......................... H01M 8/2485; H01M 8/0267
See application file for complete search history.

(56) References Cited

U.S. PATENT DOCUMENTS

| 10,714,772 | B2 * | 7/2020 | Nishida | H01M 8/04067 |
|---|---|---|---|---|
| 2018/0034087 | A1 * | 2/2018 | Watanabe | H01M 8/04014 |
| 2019/0140291 | A1 * | 5/2019 | Namba | H01M 8/043 |
| 2019/0173104 | A1 * | 6/2019 | Ishida | H01M 8/0273 |
| 2019/0312288 | A1 * | 10/2019 | Tsubouchi | H01M 8/0267 |
| 2020/0185746 | A1 * | 6/2020 | Iden | H01M 8/04723 |
| 2021/0075046 | A1 * | 3/2021 | Taneoka | H01M 8/04417 |

FOREIGN PATENT DOCUMENTS

JP         2011-028950         2/2011

* cited by examiner

*Primary Examiner* — Amanda C. Walke
(74) *Attorney, Agent, or Firm* — Amin, Turocy & Watson, LLP

(57) ABSTRACT

A fuel gas supply system includes a valve mechanism, an upstream channel for guiding a fuel gas to the valve mechanism, a downstream channel into which the fuel gas discharged from the valve mechanism is guided, a differential pressure sensor for detecting the differential pressure between the pressure of the fuel gas in the upstream channel and the pressure of the fuel gas in the downstream channel, a first pressure sensor for detecting the pressure of the fuel gas in the upstream channel, and a second pressure sensor for detecting the pressure of the fuel gas in the downstream channel. The number of the differential pressure is one, the number of the first pressure sensor is one, and the number of the second pressure sensor is one.

15 Claims, 3 Drawing Sheets

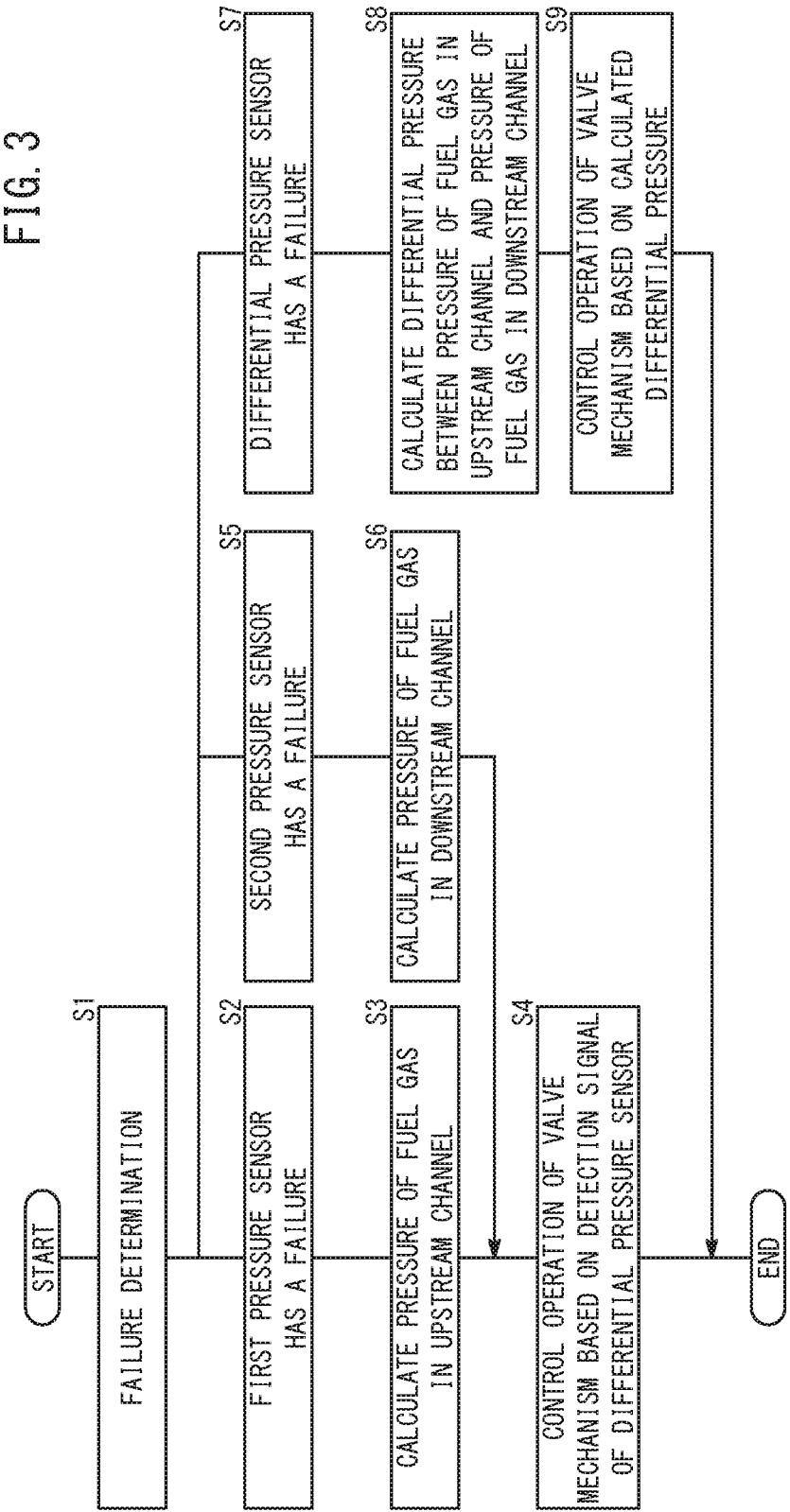

FUEL GAS SUPPLY SYSTEM

CROSS-REFERENCE TO RELATED APPLICATION

This application is based upon and claims the benefit of priority from Japanese Patent Application No. 2018-155937 filed on Aug. 23, 2018, the contents of which are incorporated herein by reference.

BACKGROUND OF THE INVENTION

Field of the Invention

The present invention relates to a fuel gas supply system for supplying a fuel gas to a fuel cell.

Description of the Related Art

For example, according to the disclosure of Japanese Laid-Open Patent Publication No. 2011-028950, an upstream pressure sensor is provided upstream of an injector in a hydrogen gas supply channel, and a downstream pressure sensor is provided downstream of the injector in the hydrogen gas supply channel, and a system calculates the differential pressure between the pressure of the hydrogen gas on the upstream side of the injector and the pressure of the hydrogen gas on the downstream side of the injector, based on the upstream pressure sensor and the downstream sensor.

SUMMARY OF THE INVENTION

However, in the conventional technique as disclosed in Japanese Laid-Open Patent Publication No. 2011-028950, since the differential pressure between the pressure of the hydrogen gas (fuel gas) on the upstream side of the injector (valve mechanism) and the pressure of the hydrogen gas on the downstream of the injector (valve mechanism) is calculated using the upstream pressure sensor and the downstream pressure sensor, the calculated differential pressure include detection errors of the upstream pressure sensor and the downstream pressure sensor, respectively.

The present invention has been made taking such a problem into account, and an object of the present invention is to provide a fuel gas supply system in which it is possible to accurately detect the differential pressure between the pressure of a fuel gas on the upstream side of a valve mechanism and the pressure of the fuel gas on the downstream side of the valve mechanism.

According to an aspect of the present invention, a fuel gas supply system for supplying a fuel gas to a fuel cell is provided. The fuel gas supply system includes a valve mechanism, an upstream channel configured to guide the fuel gas to the valve mechanism, a downstream channel into which the fuel gas discharged from the valve mechanism is guided, and a differential pressure sensor configured to detect a differential pressure between a pressure of the fuel gas in the upstream channel and a pressure of the fuel gas in the downstream channel.

In the present invention, the differential pressure sensor detects the differential pressure between the pressure of the fuel gas in the upstream channel and the pressure of the fuel gas in the downstream channel. Therefore, in comparison with the case where the differential pressure is calculated using an upstream pressure sensor and a downstream pressure sensor, it is possible to reduce detection errors. Accordingly, it is possible to accurately detect the differential pressure between the pressure of the fuel gas on the upstream side of the valve mechanism and the pressure of the fuel gas on the downstream side of the valve mechanism.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a flow chart showing control of a valve mechanism using the fuel gas supply system.

DESCRIPTION OF THE PREFERRED EMBODIMENTS

Hereafter, a preferred embodiment of a fuel gas supply system according to the present invention will be described with reference to the accompanying drawings.

A fuel cell system 12 including a fuel gas supply system 10 according to an embodiment of the present invention is mounted, e.g., in a fuel cell vehicle (not shown) such as a fuel cell electric automobile.

Figure 1:
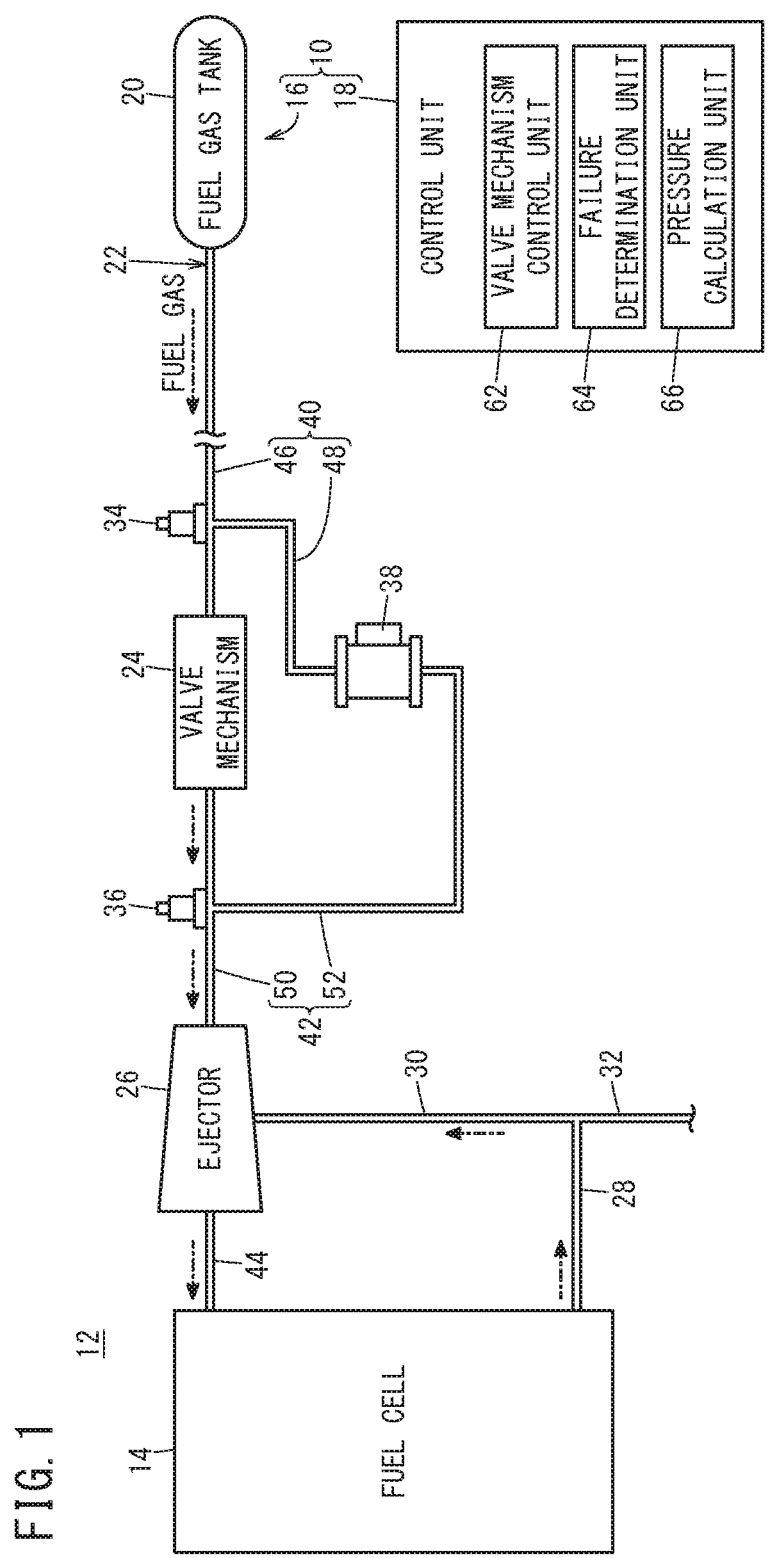
FIG. 1 is a diagram schematically showing structure of a fuel cell system including a fuel gas supply system according to an embodiment of the present invention.

As shown in FIG. 1, the fuel cell system 12 includes a fuel cell 14, the fuel gas supply system 10 for supplying a fuel gas (e.g., a hydrogen gas) to the fuel cell 14, and an oxygen-containing supply apparatus (not shown) for supplying an oxygen-containing gas (e.g., air) to the fuel cell 14. The fuel cell 14 is formed by stacking a plurality of power generation cells (not shown) for generating electricity by electrochemical reactions of the fuel gas and the oxygen-containing gas.

The fuel gas supply system 10 includes a fuel gas supply apparatus 16 and a control unit 18. The fuel gas supply apparatus 16 includes a fuel gas tank 20, a fuel gas supply channel 22, a valve mechanism 24, an ejector 26, a fuel gas discharge channel 28, a circulation channel 30, a purge channel 32, a first pressure sensor 34, a second pressure sensor 36, and a differential pressure sensor 38.

The fuel gas tank 20 stores a high pressure fuel gas (high pressure hydrogen). The fuel gas supply channel 22 is a channel for supplying the fuel gas in the fuel gas tank 20 into the fuel cell 14. The structure of the fuel gas supply channel 22 will be described in detail.

The valve mechanism 24 opens and closes the fuel gas supply channel 22. The valve mechanism 24 is an injector provided for the fuel gas supply channel 22. The valve mechanism 24 injects the fuel gas guided from the fuel gas tank 20 toward the downstream side. It should be noted that the valve mechanism 24 may be a regulator (pressure reducing valve).

The ejector 26 is provided downstream of the valve mechanism 24 (on a side closer to the fuel cell 14) in the fuel gas supply channel 22. The ejector 26 mixes the fuel gas injected from the valve mechanism 24 with a fuel exhaust gas flowing through the circulation channel 30 described later, and discharges the mixed gas toward the downstream side.

After at least some of the fuel gas is consumed in the fuel cell 14, the fuel gas is discharged from the fuel cell 14 as the fuel exhaust gas through the fuel gas discharge channel 28. The fuel exhaust gas contains water produced during power generation. A gas liquid separator (not shown) may be provided in the fuel gas discharge channel 28.

Some of the fuel exhaust gas flowing through the fuel gas discharge channel 28 is guided by the circulation channel 30 toward the ejector 26. That is, the fuel exhaust gas guided to the fuel gas discharge channel 28 flows through the circulation channel 30, the ejector 26, and the fuel gas supply channel 22, and the fuel exhaust gas is guided again to the fuel cell 14. The circulation channel 30 couples an end of the fuel gas discharge channel 28 on the downstream side and the ejector 26 together. The purge channel 32 discharges the fuel exhaust gas in the fuel gas discharge channel 28 to the outside.

Figure 2:
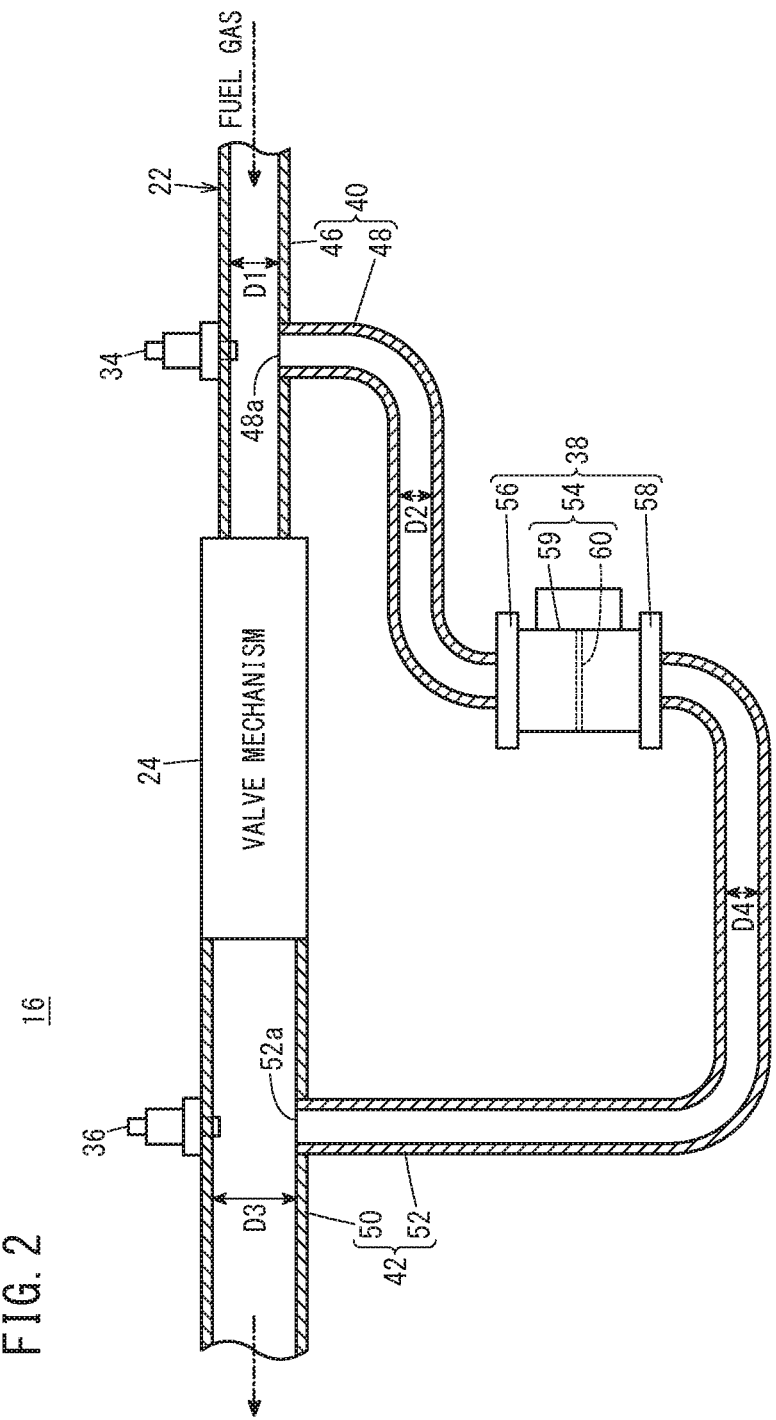
FIG. 2 is a partially enlarged view schematically showing structure of a fuel gas supply apparatus.

The fuel gas supply channel 22 includes an upstream channel 40, a downstream channel 42, and an inlet channel 44. The fuel gas discharged from the fuel gas tank 20 is guided into the valve mechanism 24 through the upstream channel 40. As shown in FIG. 2, the upstream channel 40 includes an upstream pipe 46 coupling the fuel gas tank 20 and the valve mechanism 24 together, and a first branch pipe 48 branched from the upstream pipe 46. The inner diameter D1 of the upstream pipe 46 is larger than the inner diameter D2 of the first branch pipe 48.

The first branch pipe 48 is coupled to the upstream pipe 46 at a substantially right angle, in a downward orientation. Stated otherwise, the first branch pipe 48 extends downward from the coupling part with the upstream pipe 46. That is, an upstream opening 48a opened to the upstream pipe 46 of the first branch pipe 48 is oriented upward.

The fuel gas ejected (discharged) from the valve mechanism 24 is guided into the downstream channel 42. The downstream channel 42 includes a downstream pipe 50 coupling the valve mechanism 24 and the ejector 26 (see FIG. 1) together, and a second branch pipe 52 branched from the downstream pipe 50. The inner diameter D3 of the downstream pipe 50 is larger than the inner diameter D1 of the upstream pipe 46 and the inner diameter D4 of the second branch pipe 52.

The second branch pipe 52 is coupled to the downstream pipe 50 at a substantially right angle, in a downward orientation. Stated otherwise, the second branch pipe 52 extends downward from the coupling part with the downstream pipe 50. That is, a downstream opening 52a opened to the downstream pipe 50 of the second branch pipe 52 is oriented upward. The inner diameter D4 of the second branch pipe 52 is the same as the inner diameter D2 of the first branch pipe 48. It should be noted that the inner diameter D4 of the second branch pipe 52 may be larger than the inner diameter D2 of the first branch pipe 48, or may be smaller than the inner diameter D2 of the first branch pipe 48.

In FIG. 1, the inlet channel 44 couples the ejector 26 and the fuel cell 14 together, and the fuel gas discharged from the ejector 26 is guided into the fuel cell 14.

In FIG. 2, one first pressure sensor 34, one second pressure sensor 36, and one differential pressure sensor 38 are present. The first pressure sensor 34 detects the pressure of the fuel gas in the upstream channel 40. Specifically, the first pressure sensor 34 is provided at a position of the upstream pipe 46 facing the upstream opening 48a (at a position of the upstream pipe 46 immediately above the upstream opening 48a). Stated otherwise, the upstream opening 48a is positioned immediately below the first pressure sensor 34.

It should be noted that the first pressure sensor 34 may be provided adjacent to a position of the upstream pipe 46 facing the upstream opening 48a (adjacent to a position of the upstream pipe 46 immediately above the upstream opening 48a). The first pressure sensor 34 may be a sensor for detecting the gauge pressure, or may be a sensor for detecting the absolute pressure.

The second pressure sensor 36 detects the pressure of the fuel gas in the downstream channel 42. Specifically, the second pressure sensor 36 is provided at a position of the downstream pipe 50 facing the downstream opening 52a (at a position of the downstream pipe 50 immediately above the downstream opening 52a). Stated otherwise, the downstream opening 52a is positioned immediately below the second pressure sensor 36.

It should be noted that the second pressure sensor 36 may be provided adjacent to a position of the downstream pipe 50 facing the downstream opening 52a (adjacent to a position of the downstream pipe 50 immediately above the downstream opening 52a). The second pressure sensor 36 may be a sensor for detecting the gauge pressure, or may be a sensor for detecting the absolute pressure.

The differential pressure sensor 38 detects the differential pressure between the pressure of the fuel gas in the upstream channel 40 and the pressure of the fuel gas in the downstream channel 42. The differential pressure sensor 38 is coupled to each of the first branch pipe 48 and the second branch pipe 52. The differential pressure sensor 38 includes a differential pressure sensor body 54, a first coupling part 56 coupled to the first branch pipe 48, and a second coupling part 58 coupled to the second branch pipe 52. The differential pressure sensor body 54 includes a housing 59, and a diaphragm 60 provided to divide the space in the housing 59.

The diaphragm 60 extends in a substantially horizontal direction. One space of the housing 59 (upper space) is connected to the upstream channel 40 (first branch pipe 48). The other space of the housing 59 is connected to the downstream channel 42 (second branch pipe 52). The diaphragm 60 is a pressure receiving member for receiving the pressure of the fuel gas of the upstream channel 40 (first branch pipe 48) and the pressure of the fuel gas in the downstream channel 42 (second branch pipe 52).

Stated otherwise, the pressure of the fuel gas in the first branch pipe 48 is applied to one surface of the diaphragm 60, and the pressure of the fuel gas in the second branch pipe 52 is applied to the other surface of the diaphragm 60. Specifically, the differential pressure sensor 38 detects the differential pressure between the pressure of the fuel gas in the upstream channel 40 and the pressure of the fuel gas in the downstream channel 42 based on the deformation amount of the diaphragm 60. The differential pressure sensor body 54 (diaphragm 60) is positioned below the first coupling part 56 (in the gravity direction), and above the second coupling part 58.

In FIG. 1, the control unit 18 is a computation machine including a microcomputer. The control unit 18 includes a CPU (central processing unit), a ROM, and a RAM as memories. The CPU reads, and executes programs stored in the ROM to function as a unit for realizing various functions (function realizing unit). It should be noted that the various function realizing unit may be made up of devices which realize these functions as hardware.

The control unit 18 includes a valve mechanism control unit 62, a failure determination unit 64, and a pressure calculation unit 66. The valve mechanism control unit 62 controls operation of the valve mechanism 24 based on a detection signal of the differential pressure sensor 38 to perform feedback control of the quantity of the fuel gas discharged from the valve mechanism 24 to the downstream channel 42. The failure determination unit 64 determines whether or not any one of the first pressure sensor 34, the second pressure sensor 36, and the differential pressure sensor 38 has a failure. If the failure determination unit 64 determines that any one of the first pressure sensor 34, the second pressure sensor 36, and the differential pressure sensor 38 has a failure, the pressure calculation unit 66 calculates the pressure which needs to be detected by the sensor having the failure, using sensors which do not have any failure.

Next, in the fuel gas supply system 10, control of the valve mechanism 24 in the case where a failure has occurred in any one of the first pressure sensor 34, the second pressure sensor 36, and the differential pressure sensor 38 will be described with reference to FIG. 3.

First, in step S1 of FIG. 3, the failure determination unit 64 makes a failure determination. That is, the failure determination unit 64 determines whether any one of the first pressure sensor 34, the second pressure sensor 36, and the differential pressure sensor 38 has a failure.

If the failure determination unit 64 determines that the first pressure sensor 34 has a failure (step S2), in step S3, the pressure calculation unit 66 calculates the pressure of the fuel gas in the upstream channel 40 based on a detection signal of the second pressure sensor 36 and a detection signal of the differential pressure sensor 38. Then, in step S4, the valve mechanism control unit 62 controls operation of the valve mechanism 24 based on the detection signal of the differential pressure sensor 38. Thus, the flow of a series of operations is finished.

If the failure determination unit 64 determines that the second pressure sensor 36 has a failure (step S5), in step S6, the pressure calculation unit 66 calculates the pressure of the fuel gas in the downstream channel 42 based on the detection signal of the first pressure sensor 34 and the detection signal of the differential pressure sensor 38. Then, after the process in step S4 is performed, the flow of a series of operations is finished.

If the failure determination unit 64 determines that the differential pressure sensor 38 has a failure (step S7), in step S8, the pressure calculation unit 66 calculates the differential pressure between the pressure of the fuel gas in the upstream channel 40 and the pressure of the fuel gas in the downstream channel 42 based on the detection signal of the first pressure sensor 34 and the detection signal of the second pressure sensor 36. Then, in step S9, the valve mechanism control unit 62 controls operation of the valve mechanism 24 based on the differential pressure calculated in step S8. Thus, the flow of a series of operation is finished.

As described above, in the fuel gas supply system 10, redundancy is achieved by the three sensors, i.e., the first pressure sensor 34, the second pressure sensor 36, and the differential pressure sensor 38.

The fuel gas supply system 10 according to the embodiment of the present invention offers the following advantages.

In the fuel gas supply system 10, since the differential pressure sensor 38 detects the difference pressure between the pressure of the fuel gas in the upstream channel 40 and the pressure of the fuel gas in the downstream channel 42, in comparison with the case of calculating the differential pressure from detection values of pressure sensors provided for the upstream channel 40 and the downstream channel 42, it is possible to reduce detection errors. Accordingly, it is possible to achieve cost reduction, and accurately detect the pressure difference between the pressure of the fuel gas on the upstream side of the valve mechanism 24 and the pressure of the fuel gas on the downstream side of the valve mechanism 24.

The differential pressure sensor 38 includes the pressure receiving member (diaphragm 60) for receiving the pressure of the fuel gas in the upstream channel 40 and the pressure of the fuel gas in the downstream channel 42. Accordingly, using the pressure receiving member, it is possible to reliably detect the differential pressure between the pressure of fuel gas in the upstream channel 40 and the pressure of the fuel gas in the downstream channel 42.

In this regard, in an attempt to achieve redundancy, in the case of providing two first pressure sensor 34 for the upstream pipe 46 and two second pressure sensors 36 for the downstream pipe 50 without providing the differential pressure sensor 38, it is required to adopt different specifications for the two first pressure sensors 34, and adopt different specifications for the two second pressure sensors 36, to identify common mode errors in these pressure sensors. As a result, the cost will be increased undesirably.

However, in contrast, the fuel gas supply system 10 includes the first pressure sensor 34 for detecting the pressure of the fuel gas in the upstream channel 40 and the second pressure sensor 36 for detecting the pressure of the fuel gas in the downstream channel 42. That is, the fuel gas supply system 10 includes the single differential pressure sensor 38, the single first pressure sensor 34, and the single second pressure sensor 36.

In the structure, if a failure has occurred in the differential pressure sensor 38, it is possible to calculate the differential pressure between the pressure of the fuel gas in the upstream channel 40 and the pressure of the fuel gas in the downstream channel 42 using the first pressure sensor 34 and the second pressure sensor 36. Further, if a failure has occurred in the first pressure sensor 34, it is possible to detect the pressure of the fuel gas in the upstream channel 40 using the second pressure sensor 36 and the differential pressure sensor 38. Further, if a failure has occurred in the second pressure sensor 36, it is possible to calculate the pressure of the fuel gas in the in the downstream channel 42 using the first pressure sensor 34 and the differential pressure sensor 38. Accordingly, it is possible to suppress increase in the cost, and achieve redundancy.

The upstream channel 40 includes the upstream pipe 46 coupled to the valve mechanism 24, and the first branch pipe 48 branched from the upstream pipe 46. The downstream channel 42 includes the downstream pipe 50 coupled to the valve mechanism 24, and the second branch pipe 52 branched from the downstream pipe 50. The differential pressure sensor 38 is coupled to both of the first branch pipe 48 and the second branch pipe 52.

In the structure, it is possible to suppress influence of the pulsation of the fuel gas in the upstream pipe 46 and the downstream pipe 50 produced during operating the valve mechanism 24, on the differential pressure sensor 38. Accordingly, it is possible to more accurately detect the differential pressure between the pressure of the fuel gas on the upstream side of the valve mechanism 24 and the pressure of the fuel gas the downstream side of the valve mechanism 24.

The second branch pipe 52 is coupled to the downstream pipe 50 at substantially a right angle. In the structure, it is possible to suppress the influence of the pulsation of the fuel gas in the downstream pipe 50 produced during operation of the valve mechanism 24, on the differential pressure sensor 38, to a greater extent.

The second branch pipe 52 includes the downstream opening 52a connected into the downstream pipe 50. The second pressure sensor 36 is provided at the position of the downstream pipe 50 facing the downstream opening 52a, or adjacent to the position of the downstream pipe 50 facing the downstream opening 52a.

In the structure, it is possible to suppress the influence of the pulsation of the fuel gas in the downstream pipe 50 produced during operation of the valve mechanism 24, on the second pressure sensor 36.

The first branch pipe 48 is coupled to the upstream pipe 46 at substantially a right angle. In the structure, it is possible to suppress the influence of the pulsation of the fuel gas in the upstream pipe 46 produced during operation of the valve mechanism 24, on the differential pressure sensor 38, to a greater extent.

The first branch pipe 48 includes the upstream opening 48a connected into the upstream pipe 46. The first pressure sensor 34 is provided at the position of the upstream pipe 46 facing the upstream opening 48a, or adjacent to the position of the upstream pipe 46 facing the upstream opening 48a.

In the structure it is possible to suppress the influence of the pulsation of the fuel gas in the upstream pipe 46 produced during operation of the valve mechanism 24, on the first pressure sensor 34.

The fuel gas supply system 10 includes the ejector 26 coupled to the downstream channel 42, the inlet channel 44 for guiding the fuel gas discharged from the ejector 26 to the fuel cell 14, and the circulation channel 30 for guiding the fuel exhaust gas discharged from the fuel cell 14 to the ejector 26. The differential pressure sensor 38 includes the differential pressure sensor body 54, the first coupling part 56 coupled to the first branch pipe 48, and the second coupling part 58 coupled to the second branch pipe 52. The differential pressure sensor body 54 is positioned above the second coupling part 58.

In the structure, even if the produced water in the fuel exhaust gas flows into the second branch pipe 52 through the downstream pipe 50, it is possible to suppress contact of the differential pressure sensor body 54 with the produced water.

The inner diameter D3 of the downstream pipe 50 is larger than the inner diameter D1 of the upstream pipe 46. In the structure, even if the produced water is frozen in the downstream pipe 50, it is possible to suppress clogging of the downstream pipe 50.

The fuel gas supply system 10 includes the valve mechanism control unit 62 for controlling operation of the valve mechanism 24 based on the detection signal from the differential pressure sensor 38. In the structure, it is possible to efficiently control operation of the valve mechanism 24.

The fuel gas supply system 10 includes the failure determination unit 64 for determining whether any one of the first pressure sensor 34, the second pressure sensor 36, and the differential pressure sensor 38 has a failure, and the pressure calculation unit 66 for, in the case where the failure determination unit 64 determines that any one of the first pressure sensor 34, the second pressure sensor 36, and the differential pressure sensor 38 has a failure, calculating the pressure which needs to be detected by the sensor having the failure, based on detection signals of two sensors which do not have any failure.

In the structure, even if any one of the first pressure sensor 34, the second pressure sensor 36, and the differential pressure sensor 38 has a failure, it is possible to reliably obtain the pressure which needs to be detected by the sensor having the failure.

The valve mechanism 24 is an injector. In the structure, it is possible to accurately detect the differential pressure between the pressure of the fuel gas on the upstream side of the injector and the pressure of the fuel gas on the downstream side of the injector.

The present invention is not limited to the above structure. In the fuel gas supply system 10, at least one of the first pressure sensor 34 and the second pressure sensor 36 may be dispensed with. Further, in order to achieve redundancy, in the fuel gas supply system 10, the first pressure sensor 34 and the second pressure sensor 36 may be dispensed with, and two differential pressure sensors 38 may be provided. In this case, if one of the differential pressure sensors 38 has a failure, it is possible to use a detection signal of the other of the differential pressure sensors 38.

The second branch pipe 52 may have a water storage unit capable of storing the produced water. In this case, the second coupling part 58 coupled to the second branch pipe 52 may be provided adjacent to the differential pressure sensor body 54 (diaphragm 60) in the horizontal direction, or may be provided above the differential pressure sensor body 54 (diaphragm 60).

In the fuel gas supply system 10, the first branch pipe 48 may be positioned above the upstream pipe 46, and the second branch pipe 52 may be positioned above the downstream pipe 50. In this case, it is possible to suppress entry of the produced water from the downstream pipe 50 into the second branch pipe 52.

The fuel gas supply system according to the present invention is not limited to the above described embodiment. It is a matter of course that various structures can be adopted without departing from the gist of the present invention.

What is claimed is:

1. A fuel gas supply system for supplying a fuel gas to a fuel cell, the fuel gas supply system comprising:
    a valve mechanism;
    an upstream channel configured to guide the fuel gas to the valve mechanism, wherein the upstream channel comprises an upstream pipe coupled to the valve mechanism;
    a downstream channel into which the fuel gas discharged from the valve mechanism is guided, wherein the downstream channel comprises a downstream pipe coupled to the valve mechanism, and wherein an inner diameter of the downstream pipe is larger than an inner diameter of the upstream pipe; and
    a differential pressure sensor configured to detect a differential pressure between a pressure of the fuel gas in the upstream channel and a pressure of the fuel gas in the downstream channel.

2. The fuel gas supply system according to claim 1, wherein the pressure sensor includes a pressure receiving member configured to receive the pressure of the fuel gas in the upstream channel and the pressure of the fuel gas in the downstream channel.

3. The fuel gas supply system according to claim 1, further comprising:
    a first pressure sensor configured to detect the pressure of the fuel gas in the upstream channel; and
    a second pressure sensor configured to detect the pressure of the fuel gas in the downstream channel,
    wherein the number of the differential pressure sensor is one, the number of the first pressure sensor is one, and the number of the second pressure sensor is one.

4. The fuel gas supply system according to claim 3, wherein the upstream channel further comprises:
  a first branch pipe branched from the upstream pipe;
  the downstream channel comprises:
    a second branch pipe branched from the downstream pipe;
  and wherein the differential pressure sensor is coupled to each of the first branch pipe and the second branch pipe.

5. The fuel gas supply system according to claim 4, wherein the second branch pipe is coupled to the downstream pipe at substantially a right angle.

6. The fuel gas supply system according to claim 5, wherein the second branch pipe includes a downstream opening connected into the downstream pipe; and
  the second pressure sensor is provided at a position of the downstream pipe facing the downstream opening or provided adjacent to the position of the downstream pipe facing the downstream opening.

7. The fuel gas supply system according to claim 4, wherein the first branch pipe is coupled to the upstream pipe at substantially a right angle.

8. The fuel gas supply system according to claim 7, wherein the first branch pipe includes an upstream opening connected into the upstream pipe; and
  the first pressure sensor is provided at a position of the upstream pipe facing the upstream opening or provided adjacent to the position of the upstream pipe facing the upstream opening.

9. The fuel gas supply system according to claim 4, further comprising:
  an ejector coupled to the downstream channel;
  an inlet channel configured to guide the fuel gas discharged from the ejector to the fuel cell; and
  a circulation channel configured to guide a fuel exhaust gas discharged from the fuel cell to the ejector;
  wherein the differential pressure sensor comprises:
  a differential pressure sensor body;
  a first coupling part coupled to the first branch pipe; and
  a second coupling part coupled to the second branch pipe, and
  wherein the differential pressure sensor body is positioned above the second coupling part.

10. The fuel gas supply system according to claim 1, further comprising a valve mechanism control unit configured to control operation of the valve mechanism based on a detection signal of the differential pressure sensor.

11. The fuel gas supply system according to claim 3, further comprising:
  a failure determination unit configured to determine whether any one of the first pressure sensor, the second pressure sensor, and the differential pressure sensor has a failure; and
  a pressure calculation unit configured to, in a case where the failure determination unit determines that any one of the first pressure sensor, the second pressure sensor, and the differential pressure sensor has a failure, calculate a pressure which needs to be detected by the sensor having the failure, based on detection signals of two sensors which do not have any failure.

12. The fuel gas supply system according to claim 1, wherein the valve mechanism comprises an injector.

13. The fuel gas supply system according to claim 4, wherein the inner diameter of the upstream pipe is larger than an inner diameter of the first branch pipe.

14. The fuel gas supply system according to claim 4, wherein the inner diameter of the downstream pipe is larger than an inner diameter of the second branch pipe.

15. A fuel gas supply system for supplying a fuel gas to a fuel cell, the fuel gas supply system comprising:
  a valve mechanism;
  an upstream channel configured to guide the fuel gas to the valve mechanism;
  a downstream channel into which the fuel gas discharged from the valve mechanism is guided;
  a differential pressure sensor configured to detect a differential pressure between a pressure of the fuel gas in the upstream channel and a pressure of the fuel gas in the downstream channel;
  a first pressure sensor configured to detect the pressure of the fuel gas in the upstream channel; and
  a second pressure sensor configured to detect the pressure of the fuel gas in the downstream channel,
  wherein the number of the differential pressure sensor is one, the number of the first pressure sensor is one, and the number of the second pressure sensor is one.

* * * * *